United States Patent [19]

Hahnfeld et al.

[11] Patent Number: 5,700,887
[45] Date of Patent: Dec. 23, 1997

[54] PREPARATION OF BRANCHED POLYMERS FROM VINYL AROMATIC MONOMER

[75] Inventors: Jerry L. Hahnfeld, Midland, Mich.; Timothy G. Bee, Pittsburgh, Pa.; Donald E. Kirkpatrick, Midland, Mich.; Lu Ho Tung, Oakland, Calif.; William C. Pike, Midland, Mich.

[73] Assignee: The Dow Chemical Company, Midland, Mich.

[21] Appl. No.: 595,710

[22] Filed: Feb. 2, 1996

[51] Int. Cl.$^6$ .............................. C08F 4/46; C08F 2/38; C08F 12/02
[52] U.S. Cl. .............................. 526/182; 526/82; 526/84; 526/173; 526/178; 526/346
[58] Field of Search ..................... 526/82, 84, 173, 526/178, 182

[56] References Cited

U.S. PATENT DOCUMENTS

| | | | |
|---|---|---|---|
| 3,879,366 | 4/1975 | Selman | 526/182 |
| 3,886,089 | 5/1975 | Smith, Jr. | 526/182 X |
| 4,614,768 | 9/1986 | Lo . | |
| 4,861,742 | 8/1989 | Bronstert et al. . | |
| 4,885,343 | 12/1989 | Dennis . | |

FOREIGN PATENT DOCUMENTS

| | | | |
|---|---|---|---|
| 0142214 | 8/1984 | Japan | 526/182 |

OTHER PUBLICATIONS

'Anionic polymerization of diolefin and vinyl cpds.-and crosslinking to obtain polymer networks of defined and varibable sizes.', Derwent 523694 DL125806.
Journal of Polymer Science: Part C, No. 16, (1965), pp. 4027–4034.
J. Polymer Sci: Part C, 'Synthesis of Block Polymers', No. 26 (1969), pp. 1–35.
Chem. Abstract, 78:137015, 'Anionically derived polyolefins', Brit 1,300,384.
Macromolecules, 'A new derivation of average molecular weights', V. 9, No. 2 (1976), pp.199–206.
Chemical Abstracts 85:47282p, 'Reacton rate of the formation of graft copolymer by the coupling reaction of polystyryl anion with chloromethylated polystyrene.' Polym. J. 1976 8(3)260–6.
Chem. Abstract 83:28778x, 'Coupling reacton of polystyryl anion with chloromethylated polystyrene in the presence of styrene.' Nippon Kagaku Kaishi, 1975, (3), 534–7.
Chem. Abstract 86:140976y, 'Polymer with definitely ordered functional groups', Ger. (East) 115,497.
Chem. Abstract 93:26862c, 'Synthesis and investigation of macrocyclic polystyrene', Macromolecules 1980, 13(3), 653–6.
Chem. Abstracts 93:72559g, 'Contributions to anionic polymerization,' Plaste Kautsch 1980, 27(2), 65–8.
Encyclopedia of Polymer Science & Engineering, V.2, (1985), pp. 331–333.
Encyclopedia of Polymer Science & Engineering, 'Step-Reaction Polymerization', V. 15, (1989), pp. 625–631.
Styrene Polymers, 'Ionic polymerization', V. 16, (1989), pp. 30–35.

*Primary Examiner*—Fred Teskin

[57] ABSTRACT

A process for producing a branched polymer from a vinyl aromatic monomer comprising:

A) contacting a vinyl aromatic monomer with a difunctional anionic initiator under conditions such that a dianion macromer is formed, B) contacting the dianion macromer with a multifunctional coupling agent having at least 3 reactive sites under polymerization conditions such that branches form during polymerization, and C) contacting the product of step B with a terminating agent under conditions such that the reactive sites are terminated.

3 Claims, No Drawings

5,700,887

PREPARATION OF BRANCHED POLYMERS FROM VINYL AROMATIC MONOMER

BACKGROUND OF THE INVENTION

This invention relates to a process for producing a branched polymer from a vinyl aromatic monomer. This invention particularly relates to a process for producing branched polystyrene.

Branched polymers have been previously prepared by various processes including anionic and free radical polymerizations. However, in free radical polymerizations, weight average molecular weight (Mw) and branch density are difficult to control, which can lead to gel formation. Anionic polymerizations have typically provided chain extension without branching.

German 115,497 by Popov et al., discloses a method of preparing branched polymers, which contain functional groups arranged in a controlled and defined manner along the polymer chain. These branched polymers are obtained by coupling polymer dianions with aromatic compounds containing 2 or more haloalkyl groups and 2 or more aromatically bonded halogen atoms. The polymer is then treated with sodium naphthalene to replace the halogen atoms with sodium, to form a reactive polymer which can be converted to a polymer containing functional groups, such as OH or $CO_2H$-. However, this process requires several steps and produces a comb-like branched structure, wherein all branch points originate on the same polymer backbone. This type of branching can limit the Mw of the polymer produced.

Methods of producing polystyrenes with controlled branching are disclosed in Journal of *Polymer Science*, Part C, 1965 (Publish. 1968), No. 16 (Pt. 7), pages 4027–34 (C.A. 70:29617n). However, these methods also produce a comb-like branched polymer.

Branched and network polymer production is also disclosed in Step-reaction Polymerization, *Encyclopedia of Polymer Science and Engineering*, Vol. 15, pg. 625–631, (1989). However, this reference portrays polymerizations of polyfunctional monomers having functionality greater than two as reactions which are autoaccelerating and gel forming.

Accordingly, it would be highly advantageous to provide a method for producing branched polymers having controlled branching and molecular weight without the disadvantages of autoacceleration, gelling and producing polymers having a comb-like structure, as described in the prior art.

SUMMARY OF THE INVENTION

The present invention is a process for producing a branched polymer from a vinyl aromatic monomer comprising:

A) contacting a vinyl aromatic monomer with a difunctional anionic initiator, under conditions such that a dianion macromer is formed, B) contacting the dianion macromer with a multifunctional coupling agent having at least 3 reactive sites, under polymerization conditions such that branches form during polymerization, and C) contacting the product of step B with a terminating agent, under conditions such that the reactive sites are terminated.

This process produces branched polymers with controlled Mw and branch density, without gelling, autoacceleration or a comb-like structure. These polymers can have improved properties over linear polymers in extensional rheology, melt strength, and viscosity, which can lead to processing advantages.

DESCRIPTION OF THE PREFERRED EMBODIMENTS

Vinyl aromatic monomers for use according to the present invention include, but are not limited to, those vinyl aromatic monomers previously known for use in polymerization processes, such as those exemplified in U.S. Pat. Nos. 4,666,987, 4,572,819 and 4,585,825. Preferably, the monomer is of the formula:

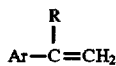

wherein R is hydrogen or methyl, Ar is an aromatic ring structure having from 1 to 3 aromatic rings with or without alkyl substitution, wherein any alkyl group contains 1 to 6 carbon atoms. Preferably, Ar is phenyl or alkylphenyl with phenyl being most preferred. Typical vinyl aromatic monomers which can be used include: styrene, alphamethylstyrene, all isomers of vinyl toluene, (paravinyltoluene being preferred among these), all isomers of ethyl styrene, propyl styrene, vinyl biphenyl, vinyl naphthalene, vinyl anthracene and the like, and mixtures thereof. In addition, the polymerization may be conducted in the presence of predissolved elastomer to prepare impact modified products. Additionally, the polymerization may be conducted in the presence of copolymerizable monomers such as dienes to produce diene block copolymers.

Difunctional anionic initiators suitable for use in the process of the present invention include any organic difunctional compound which will react with the vinyl aromatic monomer to form a dianion macromer. Difunctional anionic initiators are known in the art and taught in *The Encyclopedia of Polymer Science and Engineering*, Volume 16, pages 31–33,(1989) and Volume 2, pages 331–333 (1985), which are incorporated herein by reference. Other initiators useful in the process of the present invention include those described in U.S. Pat. Nos. 4,196,154, 4,205,016 and 4,885, 343, and 3,847,834 which are incorporated herein by reference. Typical initiators include organometallics such as organolithium, organopotassium, organocesium and organosodium compounds, examples of which include alphamethylstyrene sodium dianion, cesium naphthalene, potassium naphthalene, sodium naphthalene, styryl potassium dianion, isopropenyl-potassium dianion, and 1,4-dilithium-1,4-diaryltetra(or di)alkyl butane as disclosed in U.S. Pat. No. 4,861,742 to Bronstert et al., which is herein incorporated by reference. In a preferred embodiment, the difunctional anionic initiator is sodium naphthalene.

The difunctional anionic initiator is typically prepared or diluted in a solvent in which it is soluble. Typical solvents include nonprotic organic solvents such as benzene, tetrahydrofuran, toluene, ethyl benzene, ethers, ethyl toluene and mixtures thereof. Typically, the difunctional anionic initiator solution has a concentration of from about 0.2 to about 1 moles/liter (M), preferably from about 0.4 to about 0.6M.

The amount of difunctional anionic initiator used in step A of the present invention will depend upon the desired Mw of the dianion macromer produced. The higher the stoichiometric ratio of difunctional anionic initiator to vinyl aromatic monomer, the lower the molecular weight of the resulting dianion macromer. The stoichiometric ratio for a desired Mw can be determined using formula I:

$$Mw = \frac{(Mw \text{ of vinyl aromatic monomer})(\text{moles of vinyl aromatic monomer})}{(\text{moles of difuctional anionic initiator})} \quad (I)$$

The vinyl aromatic monomer is typically mixed with a solvent prior to the addition of the difunctional anionic initiator. The solvent can be any solvent in which the vinyl aromatic monomer and difunctional anionic initiator are soluble and which is unreactive with the difunctional anionic initiator and dianion macromer. Typically, the solvent is a nonprotic organic solvent. Preferably, the solvent is benzene, tetrahydrofuran, toluene, ethyl benzene, an ether, ethyl toluene or mixtures thereof. In a preferred embodiment of the present invention, a mixture of benzene and tetrahydrofuran is used in the ratio of approximately 10 to 1 or less, respectively, more preferably in the ratio of about 1:1.

The solvent is present in an amount sufficient to allow the dianion macromer to form without significant gel formation. Typically, the vinyl aromatic monomer is diluted with from about 15 to 50 milliliters (ml) of solvent per gram of vinyl aromatic monomer, preferably from 15 to 40 ml, more preferably from 15 to 30 ml and most preferably from 15 to 25 ml.

The solvent and vinyl aromatic monomer may be combined without any pre-treatment, but in some instances, e.g. when the vinyl aromatic monomer contains inhibitors, it is preferable to purify the monomer and solvent before being combined in Step A. This can be accomplished by any method known in the art. A preferred method comprises degassing the solvent and vinyl aromatic monomer with an inert gas, e.g. argon, for a sufficient amount of time, e.g. about 15 minutes, and passing over a bed of activated alumina to remove unwanted materials such as inhibitors and water.

The solvent and vinyl aromatic monomer are then combined and typically cooled to a temperature below 20° C. Other impurities contained in the mixture can be reacted by the dropwise addition of the difunctional anionic initiator solution until a faint yellow or orange color persists, indicating the presence of styrene anion.

The polymerization of Step A is then initiated by the further addition of the difunctional anionic initiator solution. Preferably this is accomplished by a rapid single addition with vigorous agitation to produce a dianion macromer with narrow polydispersity.

The difunctional anionic initiator can be added at any temperature below the dianion macromer decomposition temperature. Typically, the temperature is below about 100 20 C., preferably below 70° C., more preferably below 50° C. and most preferably below 20° C.

The reaction of Step A is rapid, typically taking less than 5 minutes. The reaction is also exothermic and is typically water cooled to maintain the desired temperatures described above.

Step A is typically conducted under an inert atmosphere such as argon, nitrogen or helium, at atmospheric pressures, although any pressure is acceptable.

Typically, the dianion macromer produced in Step A has a weight average molecular weight(Mw) of less than 100,000, as measured by gel permeation chromatography (GPC). Preferably, the molecular weight is from about 5,000 to about 50,000, more preferably from about 10,000 to about 40,000, and most preferably from about 15,000 to about 30,000.

Multifunctional coupling agents useful in step B of the process of the present invention, include any multifunctional compound having at least three reactive sites. Reactive sites refer to functional groups which will react with the dianion macromer to form branch points within the polymer produced. A multifunctional coupling agent having at least three reactive sites will form a branch point from which three chains originate, thus giving a greater degree of branching than a comb-like structure. Additionally, difunctional coupling agents may be used in combination with the multifunctional coupling agents described above. Typical coupling agents include, but are not limited to, benzylhalides, chloromethylsilanes, and chloromethylbenzenes. Preferably, a combination of a trifunctional coupling agent and a difunctional coupling agent is used and are selected from benzylhalides, trichloromethylsilane, dichlorodimethylsilane and di- and tri(chloromethyl)benzenes. In a preferred embodiment, a combination of 1,4-bis(chloromethyl) benzene and 1,3,5-tris(chloromethyl)benzene is used.

The amount of coupling agent(s) added to the dianion macromer in Step B of the present invention will vary according to the desired Mw, polydispersity and branch density of the polymer to be produced which is explained in better detail below. Typically, from about 0.50 to about 0.98 functional equivalents per anion equivalent are used. In other words from about 0.50 to about 0.98 chloride functional equivalents contained within the coupling agent(s) per anion contained within the dianion macromer, would be used in the case where the coupling agent(s) contains chloride reactive sites, preferably, from about 0.60 to about 0.98 equivalents, more preferably from about 0.65 to about 0.98, and most preferably from about 0.7 to about 0.95 equivalents.

The coupling agent(s) is typically diluted in a solvent prior to the addition to dianion macromer. Typically, greater dilution of the coupling agent(s) is preferred due to better control of Mw and branch density in the polymer produced. If a coupling agent(s) is used at high concentrations, the step growth polymerization reaction may progress too quickly, and high molecular weight polymer may form in areas within the reaction mixture, thus making a polymer with higher polydispersity and less controlled Mw and branch density than desired. Typically, the coupling agent(s) is diluted to form a solution of about 1 to about 5 weight percent.

Suitable solvents for diluting the coupling agent(s) include any aprotic organic solvent. Typical solvents include but are not limited to benzene, aliphatic hydrocarbons, tetrahydrofuran and diethylether.

The coupling agent(s) is typically added slowly, e.g. dropwise, with vigorous agitation. The reaction occurs very rapidly, e.g. within 5 minutes, and is exothermic and therefore maintained at a temperature which is below the decomposition temperature of the anions formed. If the temperature is too high, the anions will decompose and self-terminate. Typically, the temperature is kept below 100° C., preferably below 70° C., and more preferably below 50° C.

Step B is typically conducted under an inert atmosphere such as argon, nitrogen or helium, at atmospheric pressures, although any pressure is acceptable.

Terminating agents used in step C of the present invention include any compound, which when added to the polymerization reaction, will react with the anionic ends within the polymer and terminate the polymerization reaction. Typical terminating agents include monofunctional compounds such as methanol, $CO_2$, ethanol, benzyl halide or water.

Alternatively, the polymerization can be terminated by adding functional groups to the anionic ends left within the polymer. Chain-end functionalization, wherein the poly (vinyl aromatic)dianion ends can be converted to a wide variety of functional or reactive end groups is discussed in *The Encyclopedia of Polymer Science and Engineering*, Volume 16, pages 33–34, (1989) which is incorporated herein by reference. This is accomplished by adding the appropriate compound containing the functional groups desired, such as those discussed in "Synthesis of Block Polymers by Homogeneous Anionic Polymerization," *Journal of Polymer Science*, Part C, No. 26, pp. 1–35 (1969). These compounds include alkylene oxides, such as ethylene oxide, ethyl benzoate, benzyl halide, allyl halide, halobenzene, p-bromoaniline, n-bromophthalimide, succinic anhydride, phthalic anhydride, p-aminobenzoate, phosgene, thionyl chloride, bromonaphthalene, phosphorus tribromide, ethyl adipate, ethyl sebacate, dibromohexane, bromonaphthalene, benzoyl halide, bromine, iodine, tetrachlorethylene and carbon dioxide.

The amount of terminating agent added in Step C is typically a sufficient amount such that all active sites of the macromer are terminated. This can be detected by the disappearance of color typically associated with the presence of the polystyryl anion.

Typically, the terminating agent is added to the polymerization mixture of step B immediately after the addition of the coupling agent(s) has been completed. Alternatively, some or all of the terminating agent can be added with the coupling agent(s) in Step B. The temperature is typically maintained at a temperature below 100° C., preferably below 70° C., and more preferably below 50°.

The reaction in Step C is very rapid, typically taking less than 5 minutes.

The reaction of Step C is typically conducted under an inert atmosphere such as argon, nitrogen or helium, at atmospheric pressures, although any pressure is acceptable.

The polymer can then be precipitated in an appropriate solvent. The solvent is typically a solvent in which the polymer produced is insoluble, but in which the reaction solvent is miscible. Preferably, the solvent is a volatile lower alcohol, e.g. methanol. The polymer is typically isolated by filtration.

The process of the present invention is typically a batch process, but can be carried out as a continuous process as well. The process can be entirely contained within one reaction vessel or can be carried out in multiple reaction vessels.

The process of the present invention can also be conducted in the presence of a rubber to produce a rubber modified polymer. Typical processes are well known in the art and described in literature such as U.S. Pat. No. 5,036,130, DE 4,235,978 and DE 4,235,977.

An advantage of the process of the present invention is that by selecting the molecular weight of the dianion macromer and the amounts of specific coupling agents, it is possible to prepare a polymer having a controlled molecular weight and degree of branching. In general, the degree of branching decreases with increasing dianion macromer molecular weight. However, the branching can also be controlled by using combinations of trifunctional and difunctional coupling agents, with the degree of branching increasing as the mole ratio of trifunctional:difunctional coupling agent increases. The molecular weight and degree of branching can be predicted using formula II, with known values for the Mw of the dianion macromer and the ratio of trifunctional to difunctional coupling agent:

$$M_w = \left( 1 + \frac{6pr + \frac{(6r(1 + p(F-1)(p + p^2 r)}{1 - p^2 r(F-1)}}{(5r + 3 - rF)} \right) \times M_a \quad \text{(II)}$$

wherein:

$M_a$ is the weight average molecular weight of the repeat unit (the macromer and the coupling agents) and can be calculated by the following equation:

$$\frac{(\text{\# moles } AA)(Mw\ AA) + (\text{\# moles } AAA)(Mw\ AAA) + (\text{\# moles } BB)(Mw\ BB)}{\text{\# moles } AA + \text{\# moles } AAA + \text{\# moles } BB}$$

AA=the difunctional coupling agent
AAA=the trifunctional coupling agent
BB=the dianion macromer
p=the extent of reaction, the percentage of reacted A groups= $(A_{20}+A_{30}-A)/(A_{20}+A_{30})$,
r=the stoichiometric ratio of $(A_{20}+A_{30})/B_{20}$,
F=the average functionality of A type monomers from a randomly chosen A group and can be calculated as follows:
$F=(3A_{30}+2A_{20})/(A_{30}+A_{20})$,
$A_{20}$=the initial number of A groups from the difunctional coupling agent (AA)
$A_{30}$=the initial number of A groups from the trifunctional coupling agent (AAA),
$B_{20}$=the initial number of B groups from the dianion macromer (B2),
A=the number of unreacted A groups at p.

These equations were derived using a Miller/Macosko approach as discussed in "A New Derivation of Average Molecular Weights of Nonlinear Polymers", *Macromolecules* Vol. 9, No. 2, March–April 1976, pgs. 199–206, which is incorporated herein by reference.

Accordingly, the forgoing formula can also be used to determine approximate amounts of dianion macromer, trifunctional coupling agent and optional difunctional coupling agent necessary to obtain a desired molecular weight and degree of branching. It is noted that, as shown in the following examples, these formulas tend to underestimate actual molecular weights and degree of branching somewhat, at least under the reaction conditions described therein. Nonetheless, these formulas, taken together with practical experience, do provide a useful method by which to select starting materials and their ratios in order to obtain the desired polymer.

The molecular weight of the branched polymer can be predicted using the calculations recited above and is typically from about 100,000 to about 1,000,000, with from about 100,000 to about 500,000 being preferred, as measured by gel permeation chromatography (GPC).

Branch density is reported as the number of branches per 500 monomer units, wherein monomer refers to the vinyl aromatic monomer. The branch density can be predicted using formula (III):

$$Br500=(FracAAA)p^3/(FracBB(MwBB/MwB))500 \quad \text{(III)}$$

wherein
FracAAA=(4r–2rF)/(–5r+rF–3)
$p^3$=the fraction of AAA monomers fully reacted
FracBB=(–3)/(–5r+rF–3)
MwBB=the weight average molecular weight of the dianion macromer
MwB=the molecular weight of the vinyl aromatic monomer used to produce the dianion macromer, and
r and F are as defined previously.

These equations can be derived using the Flory approach as discussed in "Molecular Weight Distributions in Nonlinear Polymers and Theory of Gelation" Chapter IX, *Prin-*

*ciples of Polymer Chemistry*, Paul J. Flory, Cornell Univ. Press; Ithica, N.Y. 1953, which is incorporated herein by reference.

Therefore, the Mw and branch density can be predicted based on the stoichiometric ratio of dianion macromer and coupling agent(s) as shown in Formula III. Additionally, it is possible to calculate the stoichiometry needed to obtain a desired molecular structure.

The branch density of the polymers produced by the process of the present invention is typically from about 0.025 to about 2.0 branches per 500 vinyl aromatic monomer units, preferably from about 0.01 to about 1.5, more preferably from about 0.015 to about 1.0 and most preferably from about 0.02 to about 0.8 as measured according to Low Angle Laser Light Scattering (LALLS), as disclosed in *J. Polymer Science, Part C, Polym. Lett.*, 28, 193–198 (1990) by B. D. Dickie and R. J. Koopmans.

The following examples are provided to illustrate the present invention. The examples are not intended to limit the scope of the present invention and they should not be so interpreted. Amounts are in weight percentages unless otherwise indicated.

Preparation of Sodium Naphthalene Initiator

Naphthalene (6.41 g, 0.050 moles) is added to a dry argon-purged, 250 ml, round-bottom flask. Anhydrous tetrahydrofuran (THF) (100 ml) is added by syringe and the mixture is stirred and degassed while maintaining a positive argon atmosphere. To this solution is added 1.26 g (0.055 moles) of 3 to 8 mm sodium spheres which are cut into small pieces. The mixture is stirred for approximately 3 hours under argon. 50 ml of this solution is transferred to a nitrogen purged, 100 ml, round bottom flask containing a magnetic stir bar and is titrated to a colorless end-point with 1.48 ml of isopropanol to yield a concentration of 0.48M.

EXAMPLE 1

A. Anionic Polymerization of Styrene

A 2.5 liter jacketed resin pot with a bottom discharge is equipped with an argon inlet and outlet, an overhead stirrer, and two 500 ml pressure equalized addition funnels in series, wherein the addition funnel closest to the reactor contains a glass fritted disk and is charged with about 400 ml of activated alumina, and the other funnel contains an argon inlet connected to a fritted glass bubbler. Benzene (500 ml), the 51.02 g (491 mmol)styrene in sufficient benzene to give a total volume of 450 ml, and THF (two 450 ml aliquots) are sequentially degassed with argon in the upper funnel for 15 minutes before slowly passing through the lower alumina-containing funnel into the reactor. The solution is water cooled to about 10°–15 ° C. and impurities are reacted by dropwise addition with stirring of 1–4 ml of the 0.48M sodium naphthalene solution described above, until a faint yellow or orange color persists. Polymerization is then initiated by rapid addition of 2.57 mmol of the sodium naphthalene solution described previously, while the reaction mixture is continuously stirred and cooled to approximately 10°–15° C. After about 15 minutes, a small aliquot (about 5 ml) of the resulting dianion solution is transferred to a argon-purged flask in order to determine the molecular weight by GPC of the dianion macromer prior to coupling. The polystyryl anion in this aliquot is terminated by addition of a couple of drops of degassed methanol and the polymer is then precipitated in methanol and isolated by filtration. The number average molecular weight (Mn) of the dianion macromer is measured to be 21,900.

B. Preparation of Branched Polystyrene 375 mg (2.14 mmol) of 1,4-bis(chloromethyl)benzene (DCMB), and 25 mg (0.11 mmol) of 1,3,5-tris(chloromethyl)benzene (TCMB) are dissolved in 250 ml of degassed benzene and added dropwise to the solution of Step A.

C. Termination of Branched Polystyrene

Upon completion of the addition of DCMB and TCMB in Step B, the remainder of the polystyryl anions is terminated by addition of degassed methanol. The polymer is then precipitated in methanol and isolated by filtration. The Mw is measured as 302,000 and the branch density as 0.03.

EXAMPLE 2

Example 1 is repeated using 50.47 g (485 mmol) styrene, 2.52 mmol sodium naphthalene, 262 mg (1.5 mmol) DCMB, and 61 g (0.28 mmol) TCMB to yield a branched polymer having 0.07 branch density and 224,000 Mw.

EXAMPLE 3

Example 1 is repeated using 75.58 g (727 mmol) styrene, 3.77 mmol sodium naphthalene, 187 mg (1.07 mmol) DCMB, and 193 g (0.86 mmol) TCMB to yield a branched polymer having 0.26 branch density and 318,000 Mw.

EXAMPLE 4

Example 1 is repeated using 50.56 g (486 mmol) styrene, 2.53 mmol sodium naphthalene, 148 mg (0.85 mmol) DCMB, and 124 g (0.56 mmol TCMB to yield a branched polymer having 0.32 branch density and 363,000 Mw.

EXAMPLE 5

Example 1 is repeated using 49.11 g (472 mmol) styrene, 2.42 mmol sodium naphthalene, and 191 g (0.86 mmol) TCMB to yield a branched polymer having 0.45 branch density and 431,000 Mw.

TABLE I

| Example | 1 | 2 | 3 | 4 | 5 |
|---|---|---|---|---|---|
| Styrene (g) | (51.02) | (50.47) | (75.58) | (50.56) | (49.11) |
| (mmol) | (491) | (485) | (727) | (486) | (472) |
| Na Naphthalene (mmol) | 2.57 | 2.52 | 3.77 | 2.53 | 2.42 |
| Mn (macromer) | 21,900 | 21,000 | 19,500 | 20,200 | 19,200 |
| DCMB (mg) | 375 | 262 | 187 | 148 | 0 |
| (mmol) | 2.14 | 1.50 | 1.07 | 0.85 | 0.00 |
| TCMB (mg) | 25 | 61 | 193 | 124 | 191 |
| (mmol) | 0.11 | 0.28 | 0.86 | 0.56 | 0.86 |
| Branch density target | 0.10 | 0.25 | 0.50 | 0.50 | 0.75 |
| Branch density | 0.03 | 0.07 | 0.26 | 0.32 | 0.45 |
| Mw actual | 302,000 | 224,000 | 318,000 | 363,000 | 431,000 |
| Mw predicted | 321,900 | 259,300 | 289,300 | 482,800 | 504,700 |

DCMB = 1,4-bis(chloromethyl)benzene.
TCMB = 1,3-tris(chloromethyl)benzene.
Mw actual = as measured according to GPC with Low Angle Laser Light Scattering detector.
Mw prediced = based on the actual added amounts being used in the calculations as discussed previously.
Branch density = average number of branches per 500 monomer units as measured according to Low Angle Laser Light Scattering.

The process of the present invention produces branched polymers with predictable Mw without the formation of gels.

What is claimed is:

1. A process for producing branched polymer from a vinyl aromatic monomer comprising:

A) contacting a vinyl aromatic monomer with a difunctional anionic initiator, under conditions such that a dianion macromer is formed, B) contacting the dianion macromer with a multifunctional coupling agent having at least 3 reactive sites and a difunctional coupling agent, under polymerization conditions such that branches form during polymerization without the formation of gels, and C) contacting the product of step B with a terminating agent, under conditions such that the reactive sites are terminated.

2. The process of claim 1 wherein the difunctional coupling agent is 1,4-bis(chloromethyl)benzene and the multifunctional coupling agent is 1,3,5-tris(chloromethyl)benzene.

3. A process for producing branched polymer from a vinyl aromatic monomer comprising:

A) contacting a vinyl aromatic monomer with sodium naphthalene, under conditions such that a dianion macromer is formed, B) contacting the dianion macromer with a multifunctional coupling agent having at least 3 reactive sites, under polymerization conditions such that branches form during polymerization without the formation of gels, and C) contacting the product of step B with a terminating agent, under conditions such that the reactive sites are terminated.

* * * * *